US008358114B1

(12) United States Patent
Ferris et al.

(10) Patent No.: US 8,358,114 B1
(45) Date of Patent: Jan. 22, 2013

(54) OUTPUT CAPACITOR CURRENT AS FEEDBACK TO CONTROL A HYSTERETIC VOLTAGE REGULATOR

(75) Inventors: Timothy A. Ferris, Mission Viejo, CA (US); Mingying Gu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 422 days.

(21) Appl. No.: 12/431,175

(22) Filed: Apr. 28, 2009

(51) Int. Cl.
G05F 1/00 (2006.01)
(52) U.S. Cl. ..................................... 323/282
(58) Field of Classification Search .......... 323/222–223, 323/271, 272, 282, 283, 232
See application file for complete search history.

(56) References Cited

U.S. PATENT DOCUMENTS

| | | | |
|---|---|---|---|
| 5,825,165 A | 10/1998 | Kitching et al. | |
| 6,147,478 A | 11/2000 | Skelton et al. | |
| 6,188,206 B1 | 2/2001 | Nguyen et al. | |
| 6,229,350 B1 | 5/2001 | Ricon-Mora | |
| 6,249,447 B1 * | 6/2001 | Boylan et al. | 363/97 |
| 6,348,780 B1 | 2/2002 | Grant | |
| 6,366,069 B1 | 4/2002 | Nguyen et al. | |
| 6,396,251 B2 | 5/2002 | Corva et al. | |
| 6,617,834 B2 | 9/2003 | Tran | |
| 6,696,861 B1 | 2/2004 | Baldwin et al. | |
| 6,885,175 B2 | 4/2005 | Mihalka | |
| 7,034,512 B2 | 4/2006 | Xu et al. | |
| 7,098,728 B1 | 8/2006 | Mei et al. | |
| 7,382,563 B2 * | 6/2008 | Saitoh et al. | 360/60 |
| 7,423,414 B1 | 9/2008 | Culpepper et al. | |
| 7,443,148 B2 | 10/2008 | Weng | |
| 7,446,518 B2 | 11/2008 | Carpenter et al. | |
| 7,457,140 B2 | 11/2008 | Klein | |
| 7,482,791 B2 | 1/2009 | Stoichita et al. | |
| 7,787,262 B2 * | 8/2010 | Mangtani et al. | 363/18 |
| 2006/0232256 A1 | 10/2006 | Salerno | |
| 2007/0035281 A1 | 2/2007 | Kuroiwa et al. | |
| 2007/0114983 A1 | 5/2007 | Weng et al. | |
| 2007/0145965 A1 | 6/2007 | Oswald et al. | |

OTHER PUBLICATIONS

Richard Redl, "Near-Optimum Dynamic Regulation of DC-DC Converters Using Feed-Forward of Output Current and Input Voltage with Current-Mode Control", IEEE Transactions on Power Electronics, vol. PE-1, No. 3, Jul. 1986, 12 pages.

Song, "Optimizing Accuracy of Hysteretic Control", Power Electronics Technology, Feb. 2006, http://powerelectronics.com/mag/602PET20.pdf, pp. 14-21.

* cited by examiner

Primary Examiner — Adolf Berhane
Assistant Examiner — Yemane Mehari

(57) ABSTRACT

A hysteretic voltage regulator is disclosed comprising an inductor having a first end and a second end, wherein the second end is connected to an output capacitor in shunt with a load. A switch connects the first end of the inductor to a supply voltage when an output voltage across the load falls below a reference voltage, and disconnects the first end of the inductor from the supply voltage when a current flowing through the output capacitor rises above a reference current.

20 Claims, 7 Drawing Sheets

OUTPUT CAPACITOR CURRENT AS FEEDBACK TO CONTROL A HYSTERETIC VOLTAGE REGULATOR

BACKGROUND

FIG. 1A shows a prior art output voltage controlled hysteretic voltage regulator comprising a transistor for connecting a load to a supply voltage Vs through an inductor L when the output voltage Vo falls below a first reference voltage Vref1, and for disconnecting the output voltage Vo from the supply voltage Vs when the output voltage Vo exceeds a second reference voltage Vref2 higher than the first reference voltage Vref1. In the example of circuitry of FIG. 1A, an S/R flip-flop turns the transistor 2 on/off in response to the output voltage Vo. Because the feedback is based on the output voltage Vo, the prior art hysteretic voltage regulator of FIG. 1A may exhibit poor transient response if there is a sudden change in load current.

FIG. 1B shows a prior art inductor-current/output-voltage controlled hysteretic voltage regulator which helps address the poor transient response of the prior art regulator of FIG. 1A. With the prior art design of FIG. 1B, a current sensor 6 senses the inductor current 8. When the inductor current 8 falls below a second reference current Iref2, and the output voltage Vo falls below a reference voltage Vref, the S/R flip-flop 4 turns the transistor 2 on. When the inductor current 8 rises above a first reference current Iref1, the S/R flip-flop 4 turns the transistor 2 off. Although this design may improve the response to transients in the load current, it may also cause higher current ripple leading to inefficient operation. The current ripple increases because the inductor current 8 is forced to ramp from Iref1 to Iref2 and then back to Iref1 (or lower depending on the output voltage Vo).

DETAILED DESCRIPTION OF EMBODIMENTS OF THE INVENTION

Figure 2A:
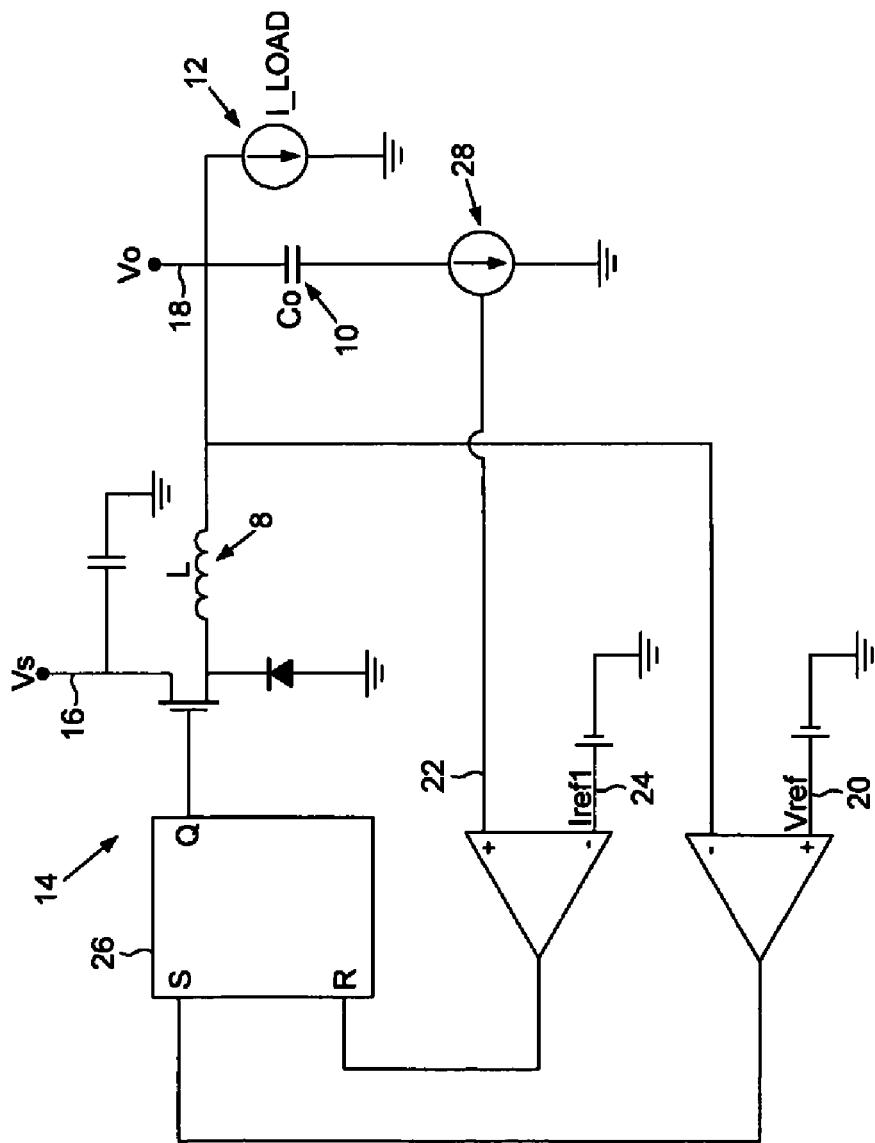
FIG. 2A shows a hysteretic voltage regulator according to an embodiment of the present invention wherein an inductor is disconnected from a supply voltage when the current flowing through an output capacitor rises above a reference current.

FIG. 2A shows a hysteretic voltage regulator according to an embodiment of the present invention comprising an inductor 8 having a first end and a second end, wherein the second end is connected to an output capacitor 10 in shunt with a load 12. A switch 14 connects the first end of the inductor 8 to a supply voltage 16 when an output voltage 18 across the load 12 falls below a reference voltage 20, and disconnects the first end of the inductor 8 from the supply voltage 16 when a current 22 flowing through the output capacitor 10 rises above a first reference current 24.

Figure 1A:
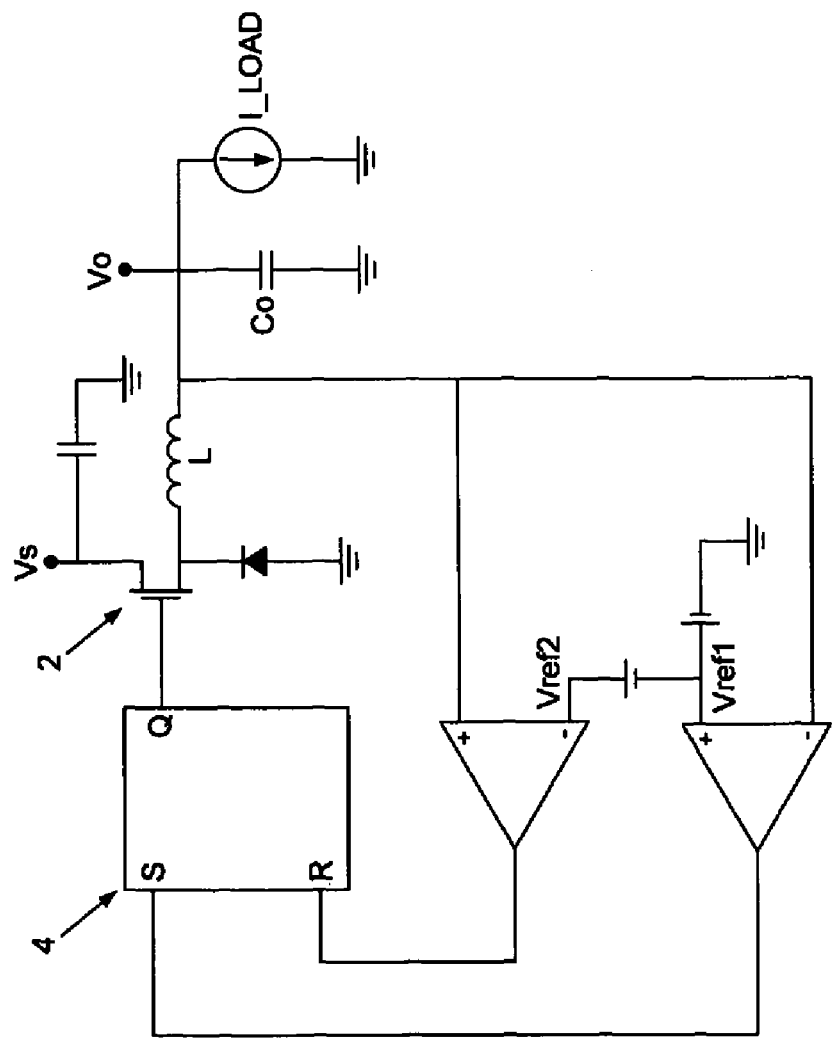
FIG. 1A shows a prior art output voltage controlled hysteretic voltage regulator.
Figure 1B:
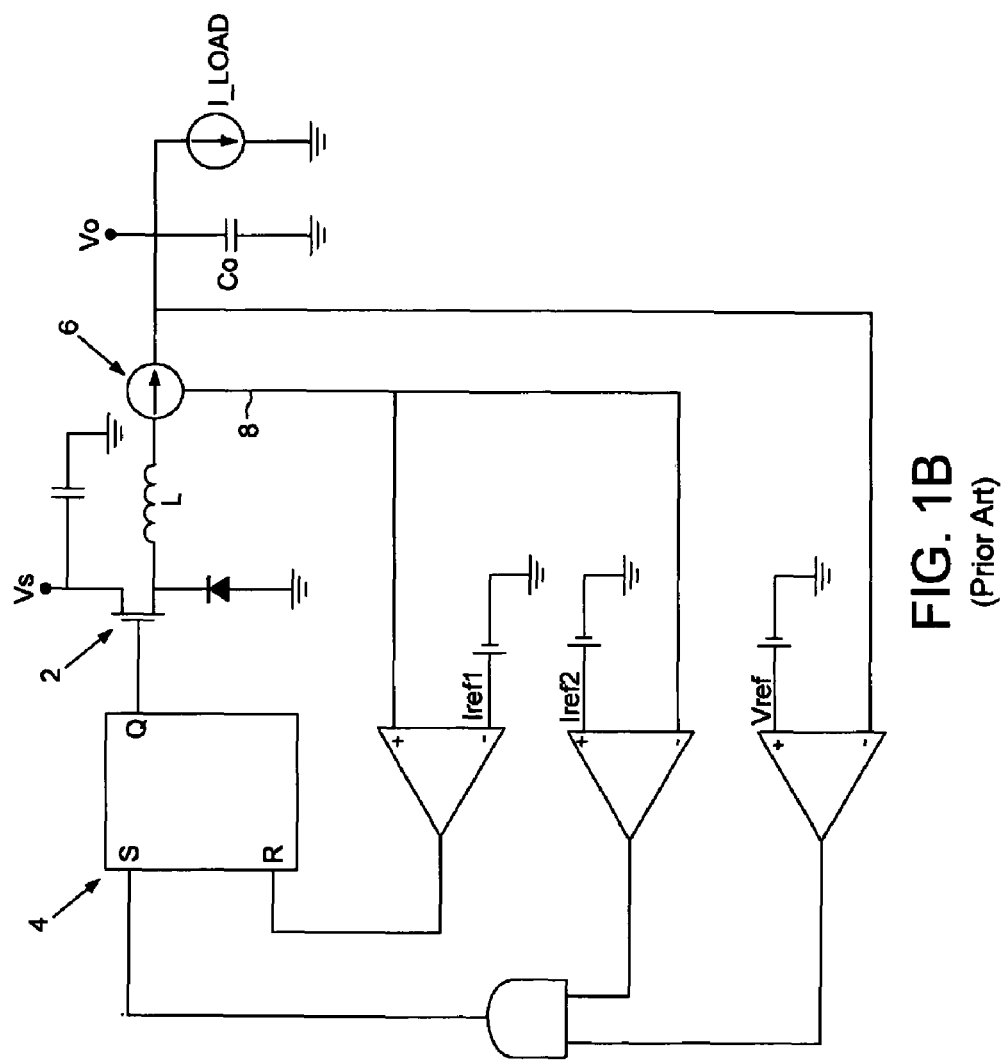
FIG. 1B shows a prior art inductor-current/output-voltage controlled hysteretic voltage regulator.

In the embodiment of FIG. 2A, the on-time of the switch 14 increases as the load current increases which improves the transient response of the hysteretic voltage regulator as compared to the prior art technique of FIG. 1A. In addition, the peak inductor current decreases as the load current decreases which reduces current ripple of the hysteretic voltage regulator as compared to the prior art technique of FIG. 1B.

In the embodiment shown in FIG. 2A, the switch 14 comprises a transistor; however, any suitable switch may be employed. The switch 14 further comprises an S/R flip-flop 26 which turns on the transistor when the S input is high, and turns off the transistor when the R input is high. However, any suitable circuitry may be employed to actuate the switch in response to the output voltage and the current flowing through the output capacitor.

Figure 2B:
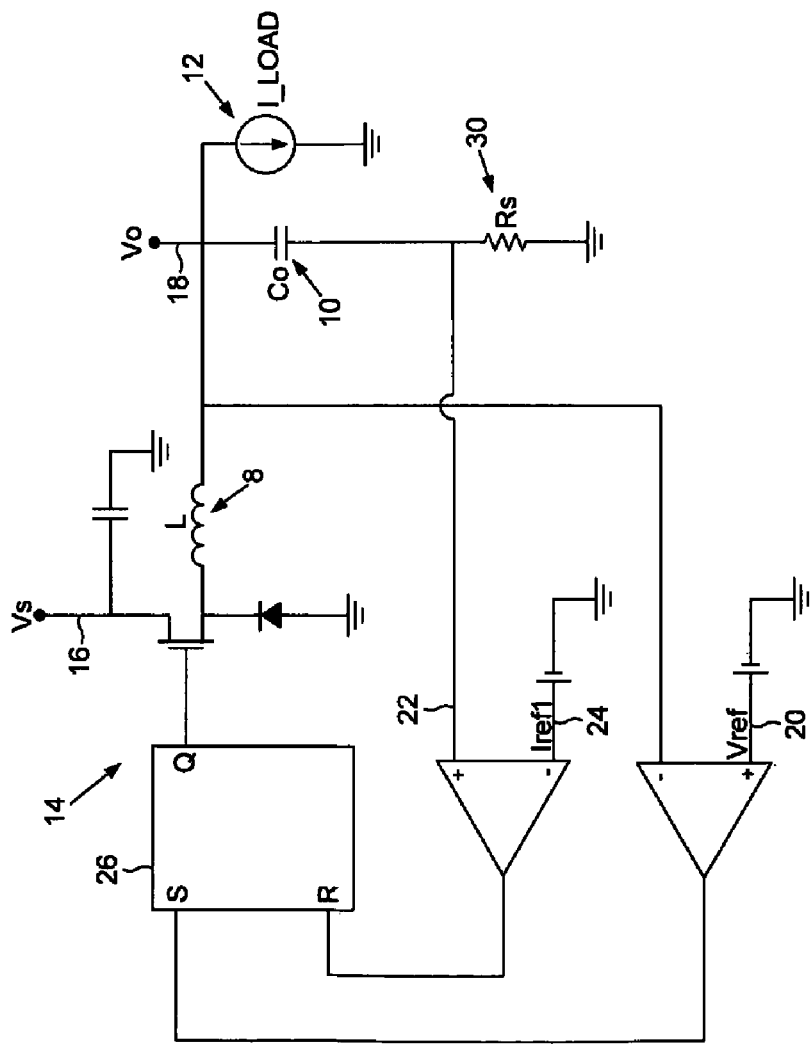
FIG. 2B shows an embodiment of the present invention wherein the current sensor for sensing the output capacitor current comprises a sense resistor.
Figure 2C:
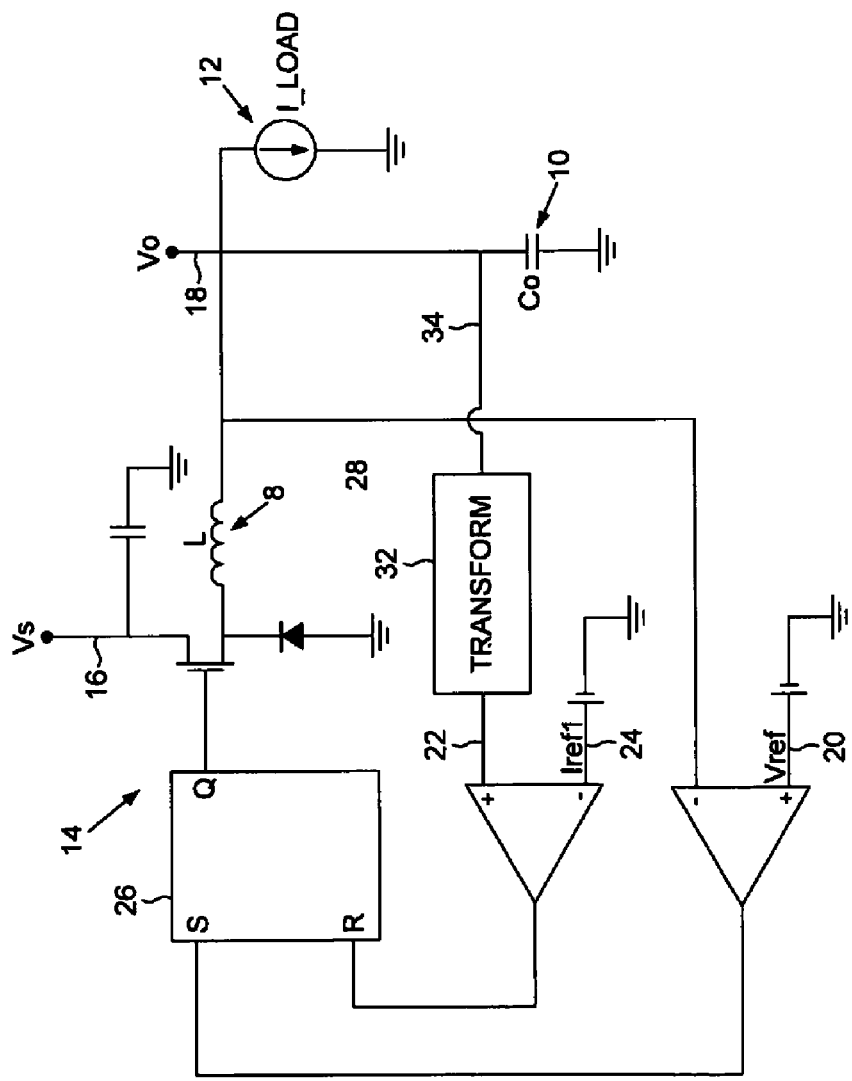
FIG. 2C shows an embodiment of the present invention wherein the output capacitor voltage is transformed into the output capacitor current.

In the embodiment of FIG. 2A, a current sensor 28 senses the current 22 flowing through the output capacitor 10. Any suitable current sensor may be employed, and in an embodiment shown in FIG. 2B, the current sensor 28 comprises a sense resistor 30. In an alternative embodiment shown in FIG. 2C, the current sensor 28 comprises a transform 32 which converts the voltage 34 across the output capacitor 10 into a corresponding capacitor current 22. In one embodiment, the transform 32 generates the capacitor current 22 according to the well known equation $i(t)=C_o\, dv/dt$ which may be implemented using any suitable circuitry, including analog and/or digital circuitry.

Figure 3:
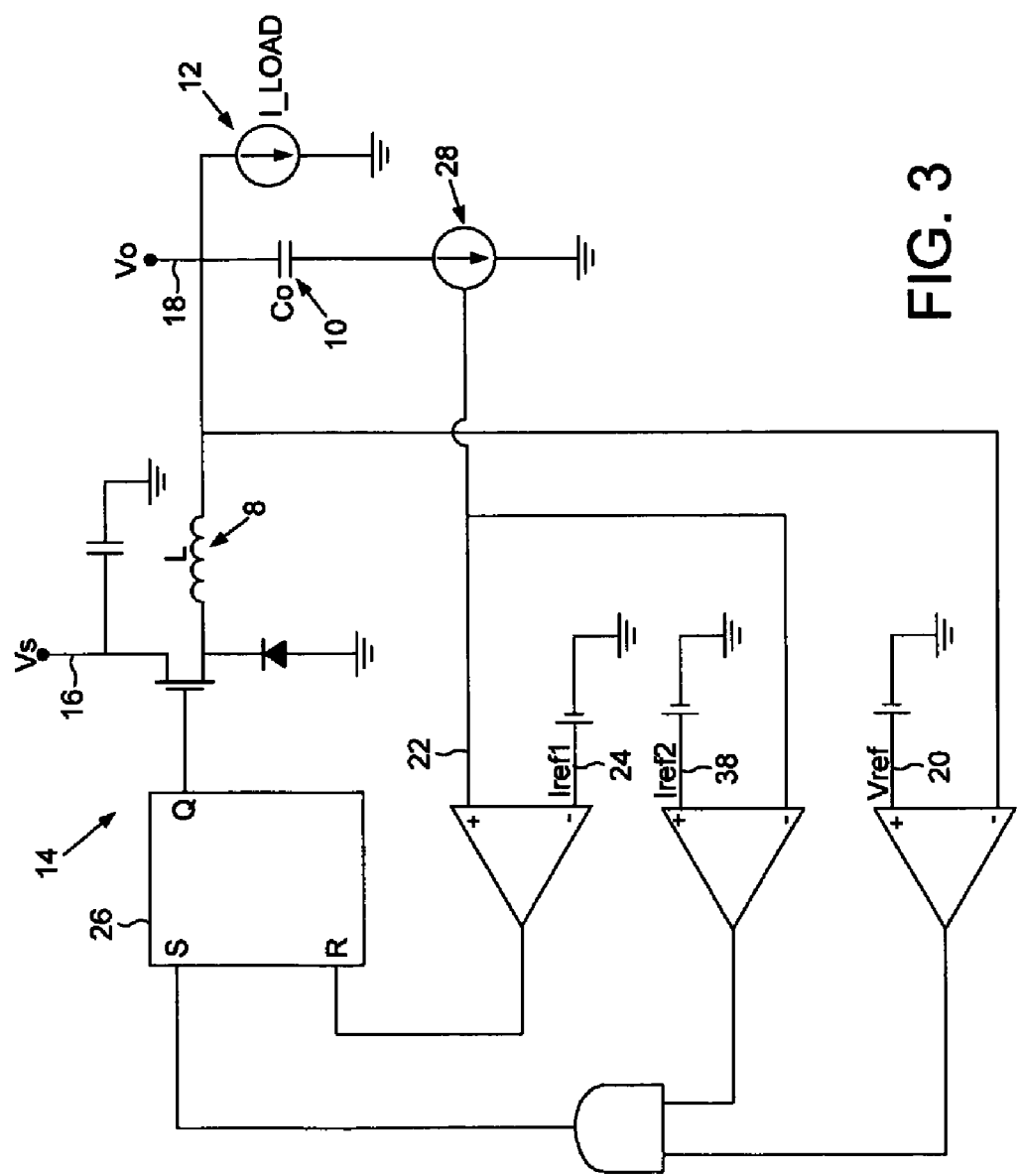
FIG. 3 shows a hysteretic voltage regulator according to an embodiment of the present invention wherein the inductor is connected to the supply voltage when the output voltage falls below a reference voltage and the output capacitor current falls below a reference current.

FIG. 3 shows an embodiment of the present invention wherein the switch 14 connects the first end of the inductor 8 to the supply voltage 16 when the output voltage 18 falls below the reference voltage 20 and the current 22 flowing through the output capacitor 10 falls below a second reference current 38. The switch 14 then disconnects the first end of the inductor 8 from the supply voltage when the current 22 flowing through the output capacitor 10 rises above the first reference current 24. This embodiment further improves the transient response and reduces ripple current by controlling the off-time of the switch 14 relative to the load current demand.

Figure 4:
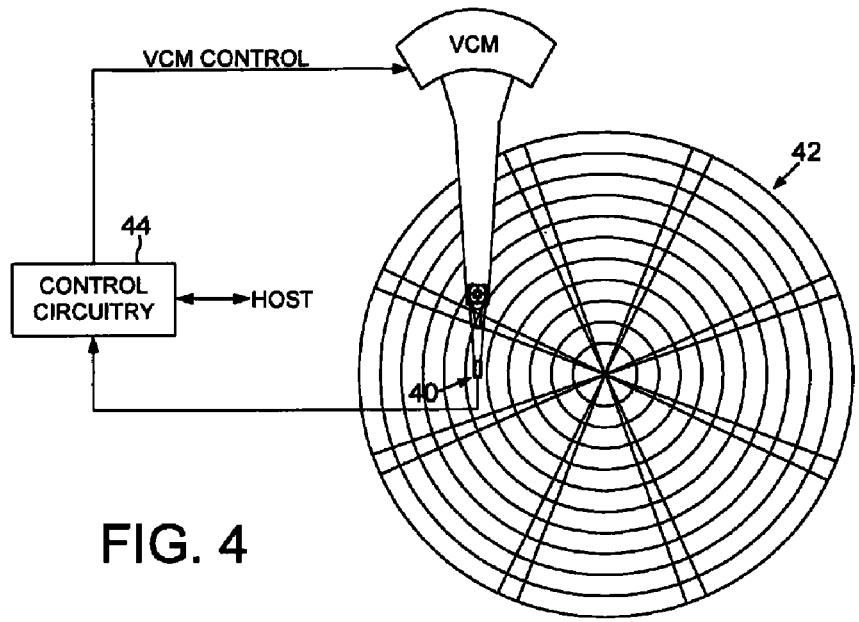
FIG. 4 shows a data storage device in the form of a disk drive comprising control circuitry including a hysteretic voltage regulator controlled using the output capacitor current according to an embodiment of the present invention.
Figure 5:
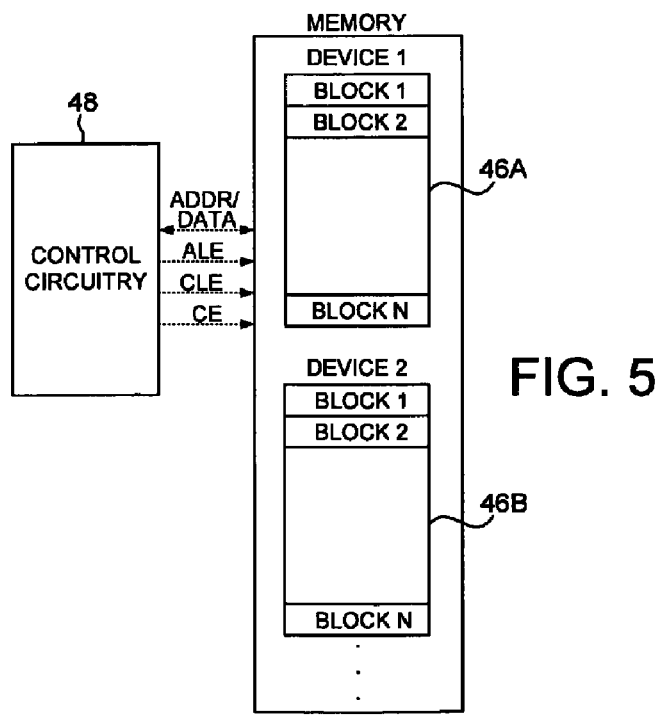
FIG. 5 shows a data storage device in the form of a solid state drive comprising control circuitry including a hysteretic voltage regulator controlled using the output capacitor current according to an embodiment of the present invention.

The hysteretic voltage regulator of the present invention may be employed in any suitable device, such as in a data storage device. FIG. 4 shows a disk drive comprising a head 40 actuated over a disk 42 and control circuitry 44 including a hysteretic voltage regulator controlled using the output capacitor current according to an embodiment of the present invention. FIG. 5 shows a solid state drive comprising a plurality of non-volatile semiconductor memories 46A, 46B, etc., such as flash memories, and control circuitry 48 including a hysteretic voltage regulator controlled using the output capacitor current according to an embodiment of the present invention.

What is claimed is:

1. A hysteretic voltage regulator comprising:
   an inductor comprising a first end and a second end, wherein the second end is connected to an output capacitor in shunt with a load such that a first current flows through the output capacitor and a second current flows through the load, wherein the first current does not include the second current; and
   a switch operable to connect the first end of the inductor to a supply voltage when an output voltage across the load falls below a reference voltage, and operable to disconnect the first end of the inductor from the supply voltage when the first current rises above a first reference current.

2. The hysteretic voltage regulator as recited in claim 1, wherein the switch comprises a transistor.

3. The hysteretic voltage regulator as recited in claim 1, wherein the switch comprises an S/R flip-flop.

4. The hysteretic voltage regulator as recited in claim 1, further comprising a current sensor operable to sense the first current flowing through the output capacitor.

5. The hysteretic voltage regulator as recited in claim 1, wherein the switch is further operable to connect the first end of the inductor to the supply voltage when the first current flowing through the output capacitor falls below a second reference current.

6. The hysteretic voltage regulator as recited in claim 4, wherein the current sensor comprises a sense resistor.

7. The hysteretic voltage regulator as recited in claim 4, wherein the current sensor comprises:
   a voltage detector operable to detect a capacitor voltage across the output capacitor; and
   a transform operable to convert the capacitor voltage into the first current flowing through the output capacitor.

8. A data storage device comprising:
   a non-volatile memory for storing data received from a host; and
   control circuitry including a hysteretic voltage regulator comprising:
      an inductor comprising a first end and a second end, wherein the second end is connected to an output capacitor in shunt with a load such that a first current flows through the output capacitor and a second current flows through the load, wherein the first current does not include the second current; and
      a switch operable to connect the first end of the inductor to a supply voltage when an output voltage across the load falls below a reference voltage, and operable to disconnect the first end of the inductor from the supply voltage when the first current rises above a first reference current.

9. The data storage device as recited in claim 8, wherein the switch comprises a transistor.

10. The data storage device as recited in claim 8, wherein the switch comprises an S/R flip-flop.

11. The data storage device as recited in claim 8, further comprising a current sensor operable to sense the first current flowing through the output capacitor.

12. The data storage device as recited in claim 8, wherein the switch is further operable to connect the first end of the inductor to the supply voltage when the first current flowing through the output capacitor falls below a second reference current.

13. The data storage device as recited in claim 8, wherein the non-volatile memory comprises a semiconductor memory.

14. The data storage device as recited in claim 8, wherein the non-volatile memory comprises a disk, further comprising a head actuated over the disk.

15. The data storage device as recited in claim 11, wherein the current sensor comprises a sense resistor.

16. The data storage device as recited in claim 11, wherein the current sensor comprises:
   a voltage detector operable to detect a capacitor voltage across the output capacitor; and
   a transform operable to convert the capacitor voltage into the first current flowing through the output capacitor.

17. A method of operating a hysteretic voltage regulator comprising an inductor including a first end and a second end, wherein the second end is connected to an output capacitor in shunt with a load such that a first current flows through the output capacitor and a second current flows through the load, wherein the first current does not include the second current, the method comprising:
   connecting the first end of the inductor to a supply voltage when an output voltage across the load falls below a reference voltage; and
   disconnecting the first end of the inductor from the supply voltage when the first current rises above a first reference current.

18. The method as recited in claim 17, further comprising sensing the first current flowing through the output capacitor using a sense resistor.

19. The method as recited in claim 17, further comprising:
   detecting a capacitor voltage across the output capacitor; and
   converting the capacitor voltage into the first current flowing through the output capacitor.

20. The method as recited in claim 17, further comprising connecting the first end of the inductor to the supply voltage when the first current flowing through the output capacitor falls below a second reference current.

* * * * *